US011340045B2

(12) United States Patent
Boyles et al.

(10) Patent No.: US 11,340,045 B2
(45) Date of Patent: May 24, 2022

(54) COLD FOGGER

(71) Applicant: TTI (MACAO COMMERCIAL OFFSHORE) LIMITED, Macau (MO)

(72) Inventors: Tyler W. Boyles, Easley, SC (US); Nicholas S. Norton, Anderson, SC (US)

(73) Assignee: Techtronic Outdoor Products Technology Limited, Hamilton (BM)

(*) Notice: Subject to any disclaimer, the term of this patent is extended or adjusted under 35 U.S.C. 154(b) by 288 days.

(21) Appl. No.: 16/196,311

(22) Filed: Nov. 20, 2018

(65) Prior Publication Data

US 2019/0154406 A1 May 23, 2019

Related U.S. Application Data

(60) Provisional application No. 62/589,153, filed on Nov. 21, 2017.

(51) Int. Cl.
*A01M 13/00* (2006.01)
*F41H 9/06* (2006.01)
*B05B 17/06* (2006.01)

(52) U.S. Cl.
CPC ............ *F41H 9/06* (2013.01); *A01M 13/00* (2013.01); *B05B 17/0615* (2013.01)

(58) Field of Classification Search
CPC .......... A01M 13/00; B05B 3/022; B05B 3/08; B05B 7/0081; B05B 7/0416;
(Continued)

(56) References Cited

U.S. PATENT DOCUMENTS 1,986,407 A 1/1935 Parker
2,112,603 A 3/1938 Perron
(Continued)

FOREIGN PATENT DOCUMENTS

CN 2810762 Y 8/2006
CN 1867410 A 11/2006
(Continued)

OTHER PUBLICATIONS

European Patent Office Search Report for Application No. 18207397.3, dated Mar. 21, 2019, 8 pages.
(Continued)

*Primary Examiner* — Charles S Bushey
(74) *Attorney, Agent, or Firm* — Michael Best & Friedrich LLP

(57) ABSTRACT

A fogger includes a blower tube having a passageway, a fan configured to rotate to generate an airflow through the passageway, a reservoir configured to hold a volume of fluid and a volume of air, an air pump in fluid communication with the fluid in the reservoir, a motor configured to drive the fan and the air pump, an atomizing valve, a dispensing line fluidly coupling the atomizing valve to the passageway, a liquid tube fluidly coupling the fluid in the reservoir to the atomizing valve, and an air escape line fluidly coupling the air in the reservoir to the atomizing valve. In response to the air pump providing a stream of compressed air to the reservoir, air moves through the air escape line from the reservoir to the atomizing valve, such that fluid is drawn through the liquid tube and into the atomizing valve to be atomized.

8 Claims, 9 Drawing Sheets

(58) Field of Classification Search
CPC ......... B05B 7/0458; B05B 7/12; B05B 7/241; B05B 7/2491; B05B 17/0615; F41H 9/06
USPC ..................................... 261/28, 30, 35, 78.2
See application file for complete search history.

(56) References Cited

U.S. PATENT DOCUMENTS

| | | | |
|---|---|---|---|
| 3,223,286 A | 12/1965 | Sawyer | |
| 3,255,967 A | 6/1966 | Kenney | |
| 3,522,911 A | 8/1970 | Collins | |
| 3,539,110 A | 11/1970 | Kobayashi | |
| 3,582,496 A | 6/1971 | Pfaffenbach | |
| 3,586,238 A | 6/1971 | Schmierer et al. | |
| 3,623,260 A | 11/1971 | Konle | |
| 3,646,701 A | 3/1972 | Praffenbach | |
| 3,648,401 A | 3/1972 | Stains | |
| 3,758,036 A | 9/1973 | Bauder et al. | |
| 3,776,459 A | 12/1973 | Bonvicini | |
| 3,793,762 A | 2/1974 | Stains | |
| 3,854,634 A * | 12/1974 | Hart | B05B 7/1472 406/136 |
| 4,089,411 A | 5/1978 | Cole et al. | |
| 4,211,198 A * | 7/1980 | Thomas, Jr. | F02M 17/16 123/523 |
| 4,221,331 A | 9/1980 | Goran, Jr. | |
| 4,256,241 A | 3/1981 | Mesic | |
| 4,387,852 A | 6/1983 | Mattson et al. | |
| 4,474,327 A | 10/1984 | Mattson et al. | |
| 4,595,142 A | 6/1986 | Kawaharazuka et al. | |
| 4,990,290 A | 2/1991 | Gill et al. | |
| 4,993,639 A | 2/1991 | Hata | |
| 5,190,225 A | 3/1993 | Williams | |
| 5,226,567 A | 7/1993 | Sansalone | |
| 5,229,278 A | 7/1993 | Kiener et al. | |
| 5,240,186 A | 8/1993 | Dobbins et al. | |
| 5,392,996 A | 2/1995 | Ussery | |
| 5,429,278 A * | 7/1995 | Sansalone | A01M 9/0046 222/195 |
| 5,779,161 A | 7/1998 | Dvorak | |
| 5,947,384 A | 9/1999 | McCauley | |
| 5,964,420 A | 10/1999 | Hampton | |
| 6,032,407 A | 3/2000 | Conner | |
| 6,070,814 A | 6/2000 | Deitesfeld | |
| 6,409,097 B1 | 6/2002 | McCauley | |
| 6,575,695 B1 | 6/2003 | Miyamoto | |
| 6,793,563 B2 | 9/2004 | Daniel | |
| 6,837,447 B1 | 1/2005 | Clark | |
| 6,857,214 B1 | 2/2005 | Pelissier | |
| 6,883,736 B1 | 4/2005 | Blatt | |
| 7,021,391 B2 | 4/2006 | Schasteen | |
| 7,065,944 B1 | 6/2006 | Steele | |
| 7,080,961 B1 | 7/2006 | Blatt | |
| 7,086,616 B2 | 8/2006 | Murphy et al. | |
| 7,213,773 B1 | 5/2007 | Rappin | |
| 7,281,675 B2 | 10/2007 | Elrod et al. | |
| 7,334,745 B2 | 2/2008 | Crawford | |
| 7,337,992 B1 | 3/2008 | Blatt | |
| 7,437,796 B2 | 10/2008 | Rappin | |
| 7,494,072 B2 * | 2/2009 | Hasegawa | B05B 1/26 239/229 |
| 7,559,490 B2 | 7/2009 | Rappin | |
| 7,673,813 B2 | 3/2010 | Raffenberg et al. | |
| 7,699,245 B1 | 4/2010 | Rappin | |
| 7,766,256 B2 | 8/2010 | Loaces | |
| 7,866,571 B2 | 1/2011 | Müller et al. | |
| 8,636,231 B2 | 1/2014 | Rosario et al. | |
| 8,672,238 B2 | 3/2014 | Stein et al. | |
| 8,727,235 B2 | 5/2014 | Nunes | |
| 8,918,956 B2 | 12/2014 | Pellenc | |
| 9,061,301 B2 | 6/2015 | Bähr et al. | |
| 9,141,580 B2 | 9/2015 | Phillips et al. | |
| 9,414,580 B2 | 8/2016 | Franks et al. | |
| 9,532,566 B1 | 1/2017 | Dunklau et al. | |
| 9,662,671 B2 | 5/2017 | Pastore | |
| 9,718,071 B2 | 8/2017 | Castillo Sancho et al. | |
| 2004/0031864 A1 | 2/2004 | Johnston | |
| 2004/0035879 A1 | 2/2004 | Vergote | |
| 2004/0255564 A1 | 12/2004 | Loaces | |
| 2006/0016917 A1 | 1/2006 | Moore et al. | |
| 2006/0081723 A1 | 4/2006 | Turberville | |
| 2006/0123758 A1 | 6/2006 | Loaces | |
| 2007/0006520 A1 | 1/2007 | Durand | |
| 2008/0272150 A1 * | 11/2008 | Hahn | B05B 7/0081 222/145.1 |
| 2009/0008473 A1 | 1/2009 | Yun | |
| 2009/0014558 A1 | 1/2009 | Phillips et al. | |
| 2009/0104033 A1 | 4/2009 | Rappin | |
| 2009/0212068 A1 | 8/2009 | Rappin | |
| 2010/0133365 A1 | 6/2010 | Bailey et al. | |
| 2011/0113586 A1 | 5/2011 | Loaces | |
| 2012/0067972 A1 | 3/2012 | Schliemann | |
| 2012/0111961 A1 | 5/2012 | Arnold | |
| 2013/0087216 A1 | 4/2013 | Hernandez | |
| 2013/0116822 A1 | 5/2013 | Atohira | |
| 2015/0115072 A1 | 4/2015 | Reitzel | |
| 2016/0001310 A1 | 1/2016 | Heide et al. | |
| 2016/0039090 A1 | 2/2016 | Oyamada et al. | |
| 2016/0332174 A1 | 11/2016 | Leslie et al. | |
| 2016/0345488 A1 | 12/2016 | Reitzel | |
| 2016/0345573 A1 | 12/2016 | Franks et al. | |
| 2017/0120447 A1 | 5/2017 | Inoue | |
| 2019/0240833 A1 | 8/2019 | Kimura | |

FOREIGN PATENT DOCUMENTS

| | | |
|---|---|---|
| CN | 2907916 Y | 6/2007 |
| CN | 203633206 U | 6/2014 |
| CN | 204769256 U | 11/2015 |
| CN | 204994473 U | 1/2016 |
| CN | 106359354 A | 2/2017 |
| CN | 205946991 U | 2/2017 |
| CN | 111515953 A | 8/2020 |
| EP | 2679092 B1 | 3/2015 |
| EP | 2586303 B1 | 8/2015 |
| EP | 2801247 B1 | 12/2016 |
| JP | 2018069428 A | 5/2018 |
| JP | 2019171501 A | 10/2019 |
| WO | 2007019604 A1 | 2/2007 |
| WO | 2007039776 A1 | 4/2007 |
| WO | 2010008374 A1 | 1/2010 |
| WO | 2010109498 A1 | 9/2010 |
| WO | 2013061683 A1 | 5/2013 |
| WO | 2013065390 A1 | 5/2013 |
| WO | 2014051300 A1 | 4/2014 |
| WO | 2015002395 A1 | 1/2015 |
| WO | 2017066686 A1 | 4/2017 |

OTHER PUBLICATIONS

Chinese Patent Office Action for Application No. 201811392121.X dated Mar. 22, 2021 (11 pages including statement of relevance).
Extended European Search Report for Application No. 20207762.4 dated Apr. 1, 2021 (10 pages).

* cited by examiner

COLD FOGGER

CROSS-REFERENCE TO RELATED APPLICATIONS

This application claims priority to U.S. Provisional Patent Application No. 62/589,153 filed on Nov. 21, 2017, the entire content of which is incorporated herein by reference.

FIELD OF THE INVENTION

The invention relates to cold foggers, and more particularly to cold foggers having two stages of atomization during the fog forming process.

BACKGROUND OF THE INVENTION

Foggers and misters are commonly used to disperse chemicals in vapor, mist or fog form. Foggers can be used to terminate pest problems or to eliminate odors. In many instances, the foggers produce a dense cloud of fog that penetrates difficult to reach areas such as shrubbery, grass, tree tops, furniture, attics, and the like.

SUMMARY OF THE INVENTION

The present invention provides, in one aspect, a fogger comprising a blower tube having a passageway, a fan configured to rotate to generate an airflow through the passageway, a reservoir configured to hold a volume of fluid and a volume of air, an air pump in fluid communication with the fluid in the reservoir, a motor configured to drive the fan and the air pump, an atomizing valve, a dispensing line fluidly coupling the atomizing valve to the passageway, a liquid tube fluidly coupling the fluid in the reservoir to the atomizing valve, and an air escape line fluidly coupling the air in the reservoir to the atomizing valve. In response to the air pump providing a stream of compressed air to the reservoir, air moves through the air escape line from the reservoir to the atomizing valve, such that fluid is drawn through the liquid tube and into the atomizing valve to be atomized.

The present invention provides, in another aspect, a fogger comprising a blower tube having a passageway, a fan configured to rotate to generate an airflow through the passageway, a first motor configured to drive rotation of the fan, a reservoir configured to hold a fluid, an air pump in fluid communication with the reservoir, a tube in fluid communication with and extending between the reservoir and the passageway, and a second motor configured to drive the air pump.

The present invention provides, in yet another aspect, a fogger comprising a blower system including a fan and a blower tube having a passageway. The fan is configured to rotate to generate an airflow through the passageway. The fogger also comprises a mist system including a reservoir configured to hold a fluid, an air pump in fluid communication with the reservoir, and a tube in fluid communication with and extending between both the reservoir and the passageway. The fogger also comprises a motor configured to drive rotation of the fan and configured to drive a pump unit of the air pump.

Other aspects of the invention will become apparent by consideration of the detailed description and accompanying drawings.

Before any embodiments of the invention are explained in detail, it is to be understood that the invention is not limited in its application to the details of embodiment and the arrangement of components set forth in the following description or illustrated in the following drawings. The invention is capable of other embodiments and of being practiced or of being carried out in various ways. Also, it is to be understood that the phraseology and terminology used herein is for the purpose of description and should not be regarded as limiting.

Figure 1:
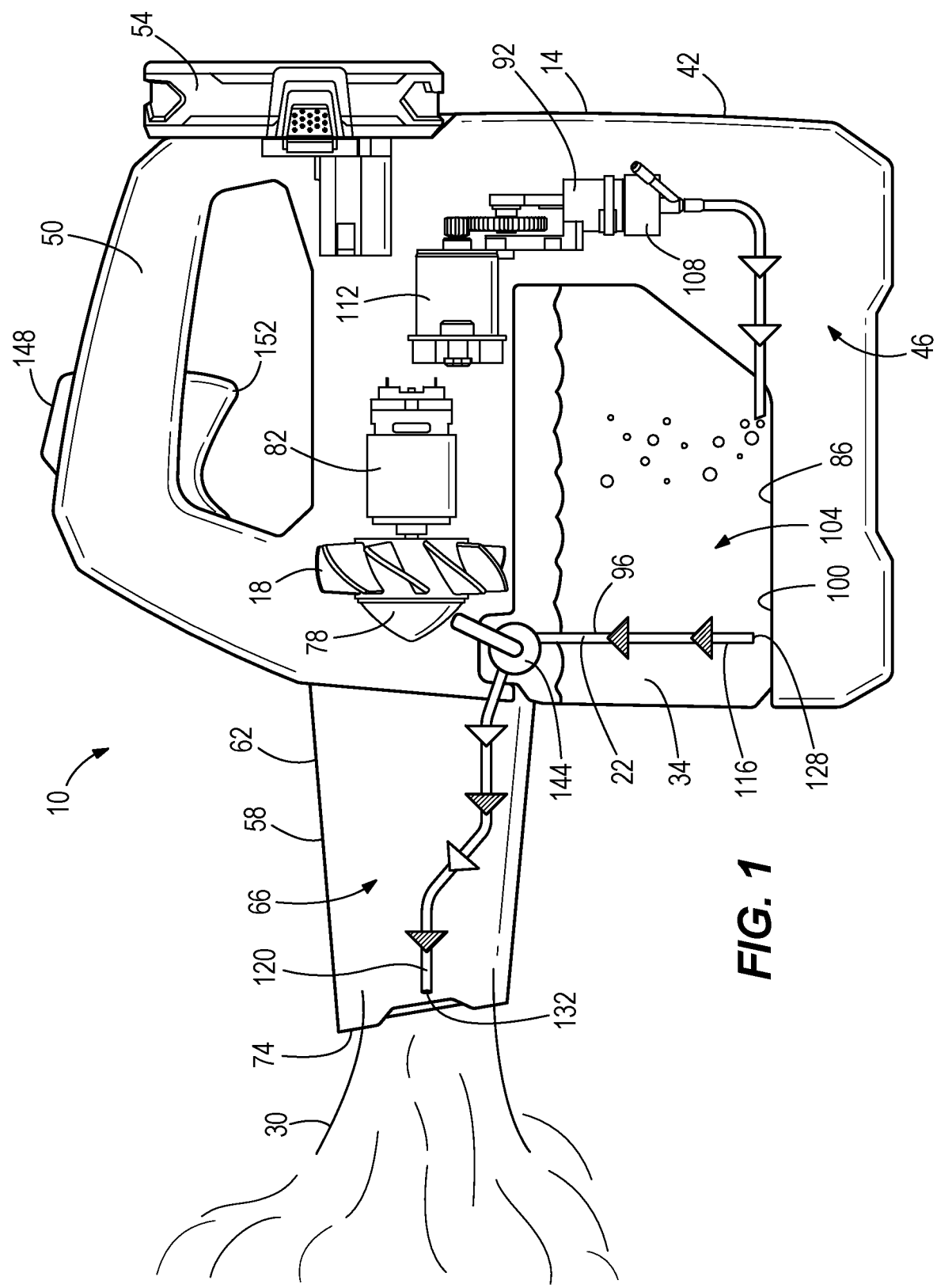
FIG. 1 is a side view of a cold fogger according to one embodiment of the invention.
Figure 2:
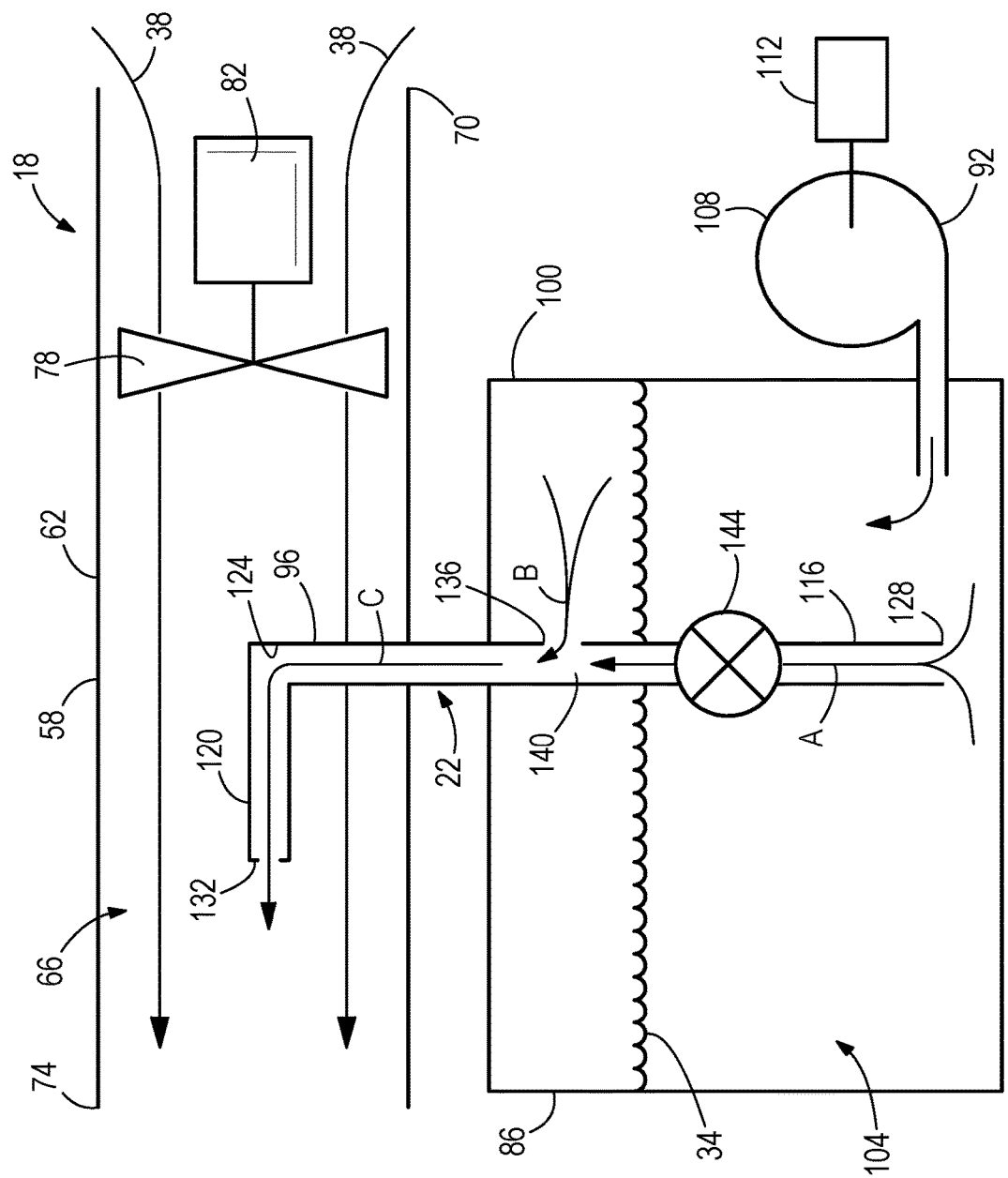
FIG. 2 is a schematic view of a blower system and a mist system of the cold fogger of FIG. 1.
Figure 3:
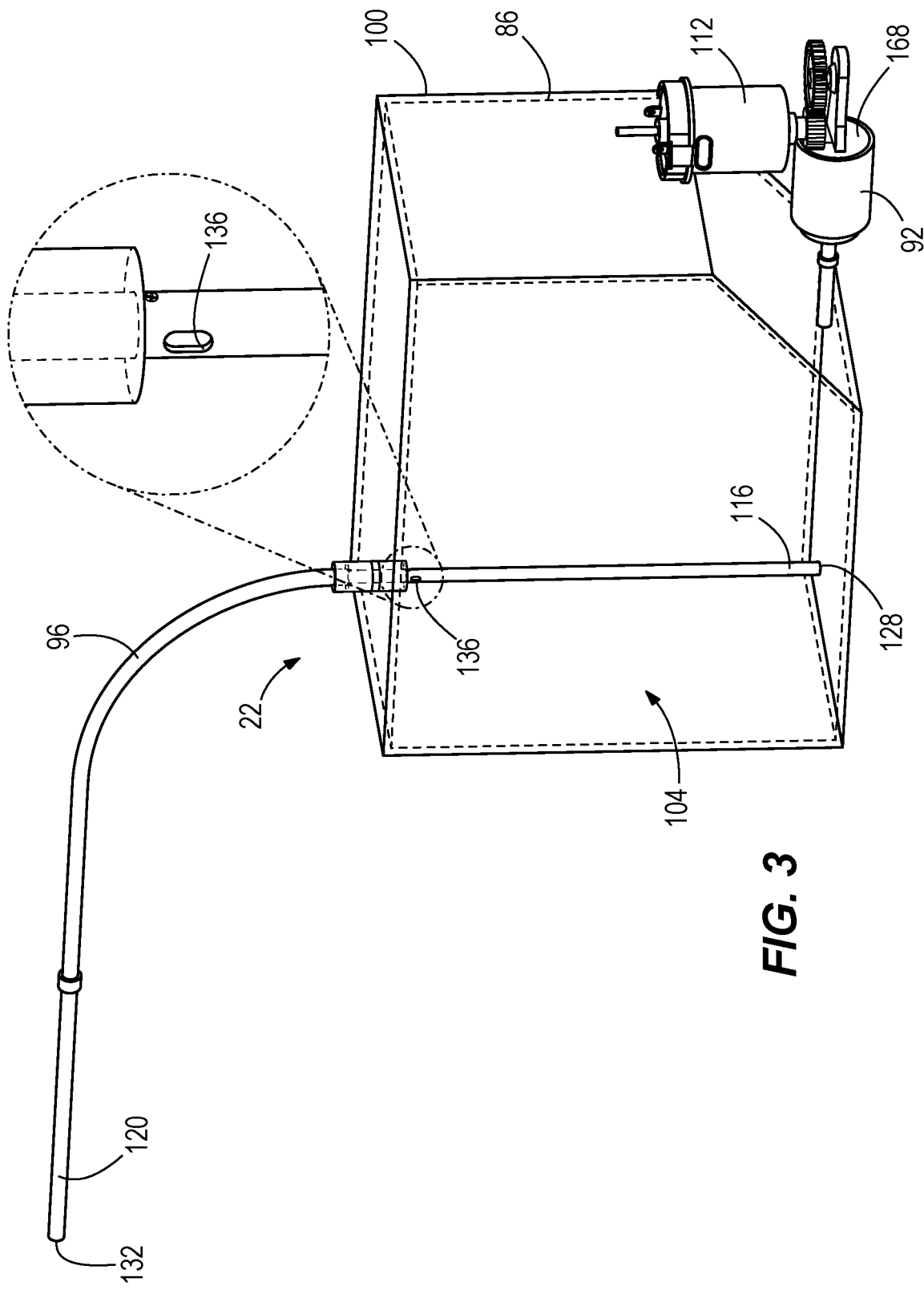
FIG. 3 is a side view of the mist system of the cold fogger of FIG. 1.
Figure 4:
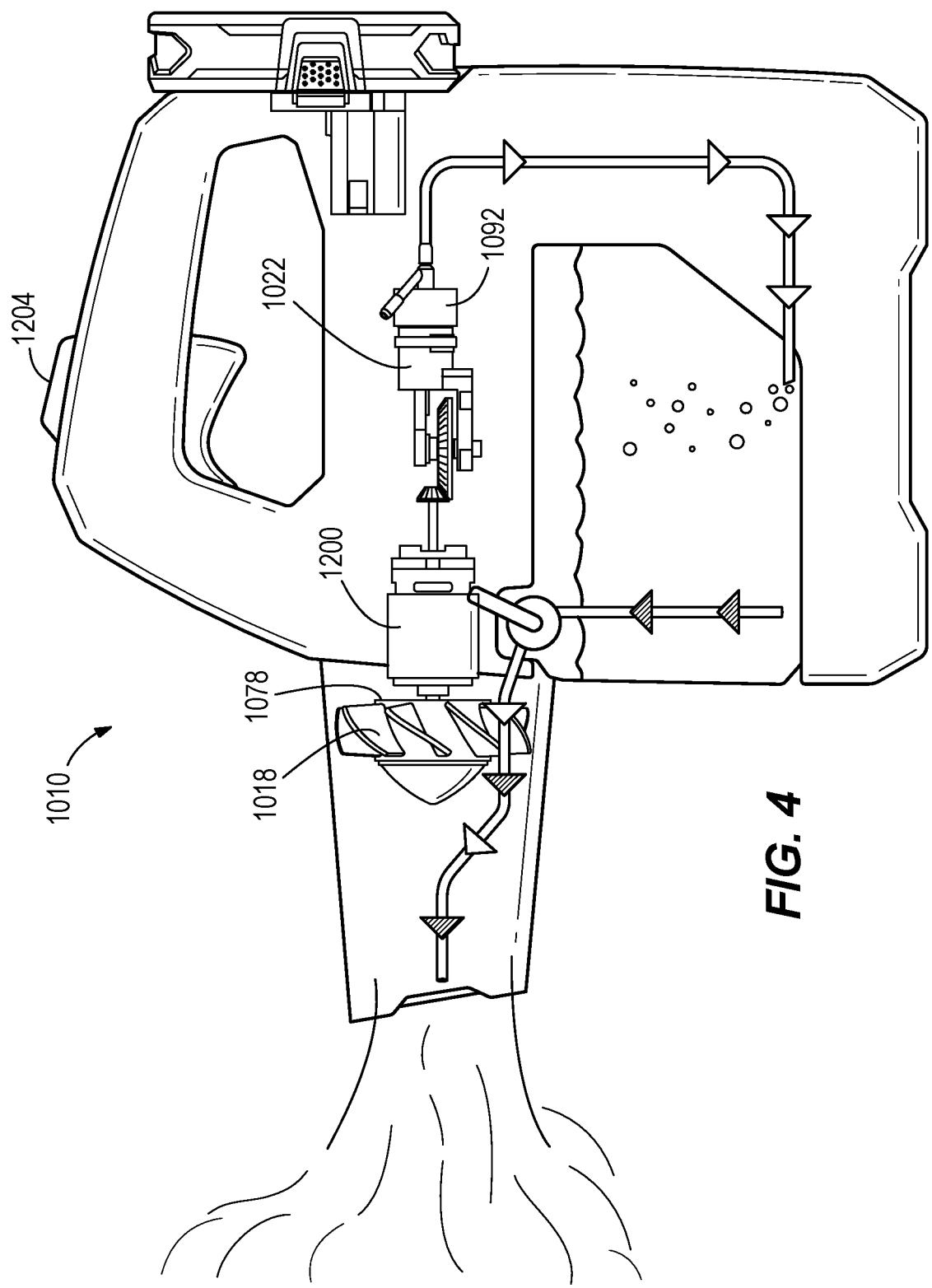
FIG. 4 is a side view of another embodiment of a cold fogger.
Figure 5:
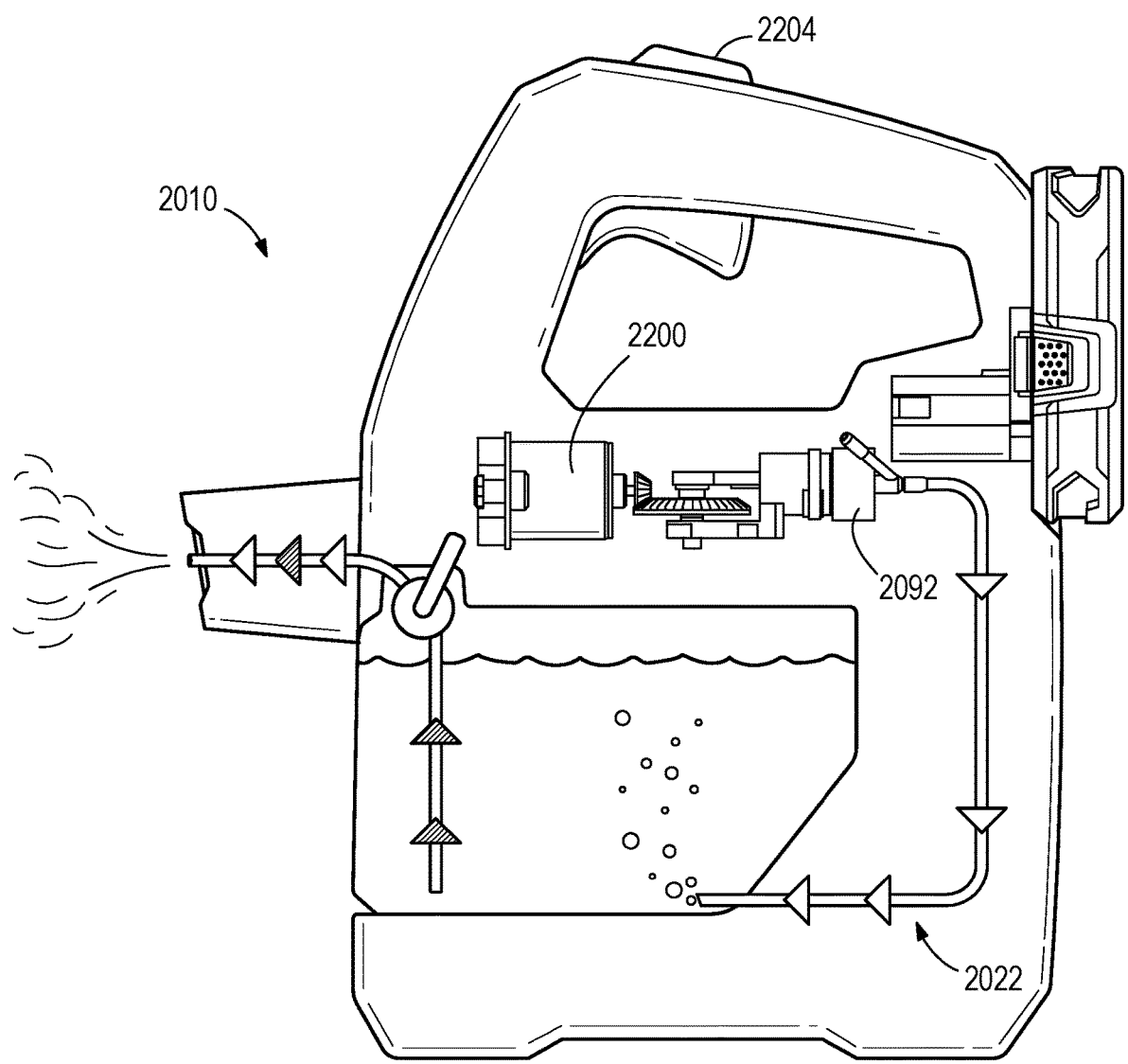
FIG. 5 is a side view of another embodiment of a cold fogger.

FIGS. 1-3 illustrate a cold fogger 10 according to one embodiment of the invention. The fogger 10 includes a housing 14, a blower system 18 supported within the housing 14, a mist system 22 in fluid communication with the blower system 18, and a power source or battery pack 54 to provide energy to the blower system 18 and the mist system 22. During use, the mist system 22 produces a dense cloud of fog, vapor, spray or mist 30 of a preselected fluid 34 that is injected into a first airflow 38 (FIG. 2) of the blower system 18. The blower system 18, in turn, is configured to propel the mist 30 toward a target area via an exhaust outlet 74 (described below). Although the illustrated fogger 10 is electrically powered by the battery pack 54 (e.g., DC power), in alternative embodiments, the fogger 10 may be AC powered (e.g., plugged into a standard home electrical socket), gas-powered (e.g., by one or more internal combustion engines), and the like.

The housing 14 of the fogger 10 includes an exterior shell or wall 42 at least partially enclosing a storage volume 46 therein. In the illustrated embodiments, the shell 42, forms one or more handle portions 50 that the user may grasp during use to manipulate the orientation and position of the fogger 10. The housing 14 also includes a battery terminal (not shown) for selectively supporting and electrically coupling with the battery pack 54.

The housing 14 also includes a blower tube 58 at least partially supported by the housing 14. The tube 58 is substantially cylindrical in shape being formed from a substantially annular outer wall 62 that defines a passageway 66 therethrough. The blower tube 58 also includes an inlet 70 (FIG. 2) through which ambient air is drawn into the passageway 66 of the blower tube 58, and the exhaust outlet 74 opposite the inlet 70 through which a combination of the first airflow 38 and the mist 30 may be discharged during operation. In some embodiments, the inlets 70 are formed in the housing 14 of the fogger 10. In the illustrated embodiment, the blower tube 58 is substantially frusto-conical in shape reducing in diameter as it extends outwardly from the housing 14 to accelerate the flow of air through the exhaust outlet 74.

The blower system 18 of the fogger 10 includes a fan head 78 positioned within the passageway 66 of the blower tube 58, and a first motor 82 configured to rotate the fan head 78 with respect to the blower tube 58. During use, rotating the fan head 78 with respect to the blower tube 58 produces the first airflow 38 through the passageway 66. More specifically, the rotation of the fan head 78 draws ambient air into the inlet 70 where the air is accelerated by the fan head 78 and expelled through the exhaust outlet 74.

Illustrated in FIGS. 1-3, the mist system 22 of the cold fogger 10 includes a reservoir 86, an air pump 92 in fluid communication with the reservoir 86, and a tube 96 in fluid communication with and extending between both the reservoir 86 and the passageway 66. During use, the mist system 22 is configured to atomize the fluid 34 contained in the reservoir 66 and mix the atomized fluid 34 with a compressed air source to produce a dense mist 30. The resulting mist 30 is then directed into the passageway 66 of the blower tube 58 for subsequent distribution. In the illustrated embodiment, the mist system 22 is configured to atomize the fluid 34 in two separate stages.

The reservoir 86 of the mist system 22 includes a shell or set of outer walls 100 enclosing and defining a reservoir volume 104 therein. In the illustrated embodiment, the reservoir 86 is air-tight such that it can store the desired volume of fluid 34 therein and be pressurized via air from the air pump 92 (described below). Although not shown, the reservoir 86 may also include a filler neck and cap to allow the user to pour the desired fluid 34 into the reservoir volume 104. The reservoir may also include a dip stick or other indicator providing information regarding the level of fluid contained within the reservoir volume 34.

The air pump 92 of the mist system 22 includes a pump unit 108 in fluid communication with the reservoir volume 104, and a second motor 112 configured to drive the pump unit 108 independently of the first motor 82 of the blower system 18. During use, operation of the second motor 112 causes the pump unit 108 to draw ambient air from the surrounding atmosphere and pump the air, under pressure, into the reservoir volume 104. Generally speaking, the speed at which the motor 112 operates dictates the rate at which air is pumped into the reservoir volume 104 and, as a corollary, the resulting air pressure therein. As such, the air pressure within the reservoir volume 104 can be varied by changing the operating speed of the motor 112. More specifically, operating the motor 112 at a first speed conveys a first flow rate of compressed air into the reservoir volume 104, while operating the motor 112 at a second speed, less than the first speed, conveys a second flow rate of compressed air into the reservoir volume 104 less than the first flow rate.

In the illustrated embodiment, the pump unit 108 of the air pump 92 is a positive displacement reciprocating piston style pump. However, in other embodiments, different pump styles may be used. In still other embodiments, the fogger 10 may be operably coupled to an external source of compressed air (not shown).

Best illustrated in FIG. 2, the tube 96 of the fogger 10 is substantially elongated in shape having a first end 116, a second end 120 opposite the first end 116, and defining a channel 124 therethrough. The tube 96 also includes a fluid inlet 128, an outlet 132 downstream of the fluid inlet 128, and a compressed air inlet 136 positioned between the fluid inlet 128 and the outlet 132.

The fluid inlet 128 of the tube 96 is positioned proximate the first end 116 thereof and is in fluid communication with the reservoir volume 104. In the illustrated embodiment, the fluid inlet 128 is positioned proximate the bottom of the reservoir volume 104 and is configured to be completely submerged within the fluid 34 contained therein. As such, the fluid inlet 128 is configured to draw the fluid 34 contained within the reservoir volume 104 into the channel 124 during use (see Flow A of FIG. 2). Although not shown, the fluid inlet 128 may include a filter or screen to restrict the passage of any debris or contaminants into the channel 124.

The compressed air inlet 136 of the tube 96 is in fluid communication with the channel 124 and positioned downstream of the fluid inlet 128. When assembled, the compressed air inlet 136 is positioned proximate the top of the reservoir volume 104 and is configured to be positioned above the surface level of the fluid 34 contained therein. As such, the compressed air inlet 136 allows compressed air contained within the reservoir volume 104 to flow into the channel 124 and create a low pressure region 140 therein via a venturi effect (see Flow B of FIG. 2). Although not shown, the compressed air inlet 136 may also include one or more baffles or guards to limit the amount of fluid 34 that passes through the compressed air inlet 136 as it sloshes around within the reservoir volume 104 during use. In the illustrated embodiment, the compressed air inlet 136 includes a single aperture that is substantially circular in shape. However, in other embodiments, fewer or more apertures may be present, each of which may be any size and or shape as necessary to provide the desired flow characteristics.

The outlet 132 of the tube 96 is positioned proximate the second end 120 thereof and is positioned within the passageway 66 of the blower tube 58. The outlet 132 includes a first orifice sized such that when a pressurized air and liquid mixture passes through the outlet 132 (see Flow C of FIG. 2) the blowout velocity atomizes the liquid passing therethrough. In the illustrated embodiment, the outlet 132 is a single, circular aperture being approximately 20 microns in diameter. However, in other embodiments fewer or more apertures may be present and the outlet 132 may include any shape and/or size that produces the desired atomization.

The tube 96 also includes a valve 144. The valve 144 is in fluid communication with the channel 124 and positioned between the fluid inlet 128 and the compressed air inlet 136. During use, the valve 144 selectively restricts the flow of fluid 34 between the fluid inlet 128 and the compressed air inlet 136. As such, adjusting the valve 144 allows the user to change the level or restriction placed on the fluid 34 flowing through the channel 124 (see Flow A), and as a corollary, the fluid to air ratio of the resulting mist 30 produced within the tube 96. More specifically, the greater the restriction to Flow A provided by the valve 144, the less fluid 34 can flow through the channel 124 and the leaner the resulting mist 30. In contrast, lessening the restriction to Flow A allows more fluid 34 to flow through the channel 124 and results in a richer mist 30.

During use, the tube 96 receives fluid 34 and compressed air from the reservoir volume 104, atomizes the fluid in two separate stages to produce a mist 30, and outputs the resulting mist 30 into the passageway 66 of the blower tube 58 for subsequent dispersal. More specifically, the compressed air contained within the reservoir volume 104 flows into the channel 124 via the compressed air inlet 136 and flows toward the second end 120 of the tube 96 as a result of the air pressure differential between the reservoir volume 104 and the passageway 66 (see Flow B). As a result of this airflow, a low pressure region 140 is produced within the channel 124 between the compressed air inlet 136 and the fluid inlet 128 due to a venturi effect. The low pressure region 140, in turn, draws fluid into the channel 124 via the fluid inlet 128 and toward the compressed air inlet 136 (see Flow A). Together, the interaction between the two flows (Flow A and Flow B) causes the fluid 34 within the channel 124 to undergo a first atomization stage while also mixing the two flows together to form a combined Flow C (FIG. 2).

Furthermore, the valve 144 may be adjusted during operation of the fogger 10 to modify the level of resistance placed on Flow A. As described above, such changes are used to modify the resulting air to fluid ratio of the combined Flow C. Furthermore, the valve 144 is used to compensate for changes in the viscosity of the liquid 34 or changes in the air pressure of the reservoir volume 104.

Once mixed, Flow C continues along the channel 124 and through the outlet 132. As described above, passage of the combined Flow C through the outlet 132 causes the once atomized fluid 34 of Flow C to be atomized a second time. This second atomization produces the finished mist 30 which is directed into the passageway 66 for subsequent dispersal.

Illustrated in FIG. 1, the fogger 10 also includes a mist control switch 148 and a blower control switch 152. Together, the switches (148, 152) provide two modes of operation for the fogger 10. More specifically, the fogger 10 is operable in a "forced air mode," where the blower system 18 and the mist system 22 are both operating, causing the mist 30 produced by the mist system 22 to be actively propelled from the exhaust outlet 74 by the blower system 18 (e.g., via the first airflow 38). Furthermore, the fogger 10 is operable in an "ambient air mode," where the mist system 22 is active but the blower system 18 is not active so that the mist 30 produced by the mist system 22 is not actively propelled from the exhaust outlet 74 by the blower system 18 (e.g., the first airflow 38 is not present).

In the illustrated embodiment, the mist control switch 148 is an on/off switch allowing the user to selectively provide electrical power to the air pump 92. During use, the mist control switch 148 is adjustable between an on position, where the second motor 112 is in electrical communication with the power source, and a second position, where the second motor 112 is not in electrical communication with the power source. While the illustrated embodiment includes an on/off switch that provides only one operating speed for the motor 112 (and therefore only one output value for the pump unit 108); it is to be understood that in other embodiments a variable speed switch may be used to allow the user to adjust the volume of air being pumped into the reservoir volume 104 by the air pump 92.

In the illustrated embodiment, the blower control switch 152 is a variable speed trigger configured to provide a continuously variable level of electrical power to the first motor 82 independent of the operation of the air pump 92. As such, the user is able to vary the rotational speed of the fan head 78 within the blower tube 58, and as a corollary, the speed of the first airflow 38.

To operate the fogger 10, the user first fills the reservoir volume 104 with the desired liquid or chemical 34. After sealing the reservoir, the user then manipulates the mist control switch 148 from the off configuration to the on configuration. By doing so, the user provides power to the air pump 92, which begins pumping pressurized air into the reservoir volume 104 increasing the air pressure therein. As the pressure differential between the reservoir volume 104 and the passageway 66 increases, the pressurized air within the reservoir volume 104 begins flowing into the channel 124 via the compressed air inlet 136 of the tube 96. As described above, the flow of air through the compressed air inlet 136 draws the fluid 34 into the channel 124 via the fluid inlet 128 which causes the mist system 22 to begin dispensing mist 30 into the passageway 66 via the outlet 132.

If the user wishes to operate the fogger 10 in the "ambient air mode," the user may remain in this configuration permitting the mist 30 to naturally flow along the passageway 66 and out through the exhaust outlet 74. However, if the user wishes to operate the fogger 10 in the "forced air mode," the user may depress the blower control switch 152 to provide electrical power to the blower system 18.

Once the blower control switch 152 is depressed, the first electrical motor 82 begins to rotate the fan head 78 with respect to the blower tube 58 producing the first airflow 38. The first airflow 38, in turn, interacts with the mist 30 being dispensed from the mist system 22 to actively propel the mist 30 from the exhaust outlet 74. During operation, the user is able to vary the speed of the first airflow 38 (and therefore the speed at which the mist 30 is propelled from the exhaust outlet 74) by varying the position of the blower control switch 152. Furthermore, the user can return to "ambient air mode" by releasing the blower control switch 152 completely.

Once the user is completed his or her task, the user may then return the mist control switch 148 to the off configuration, causing the air pump 92 to cease operation. Once the pump 92 is turned off, the air pressure within the reservoir volume 104 returns to equilibrium with the passageway 66 causing the mist system 22 to no longer produce any mist 30.

FIG. 4 illustrates another embodiment of the cold fogger 1010. The cold fogger 1010 is substantially similar to and operates in much the same manner as the cold fogger 10, described above. As such, only the differences between the two designs will be described herein. The cold fogger 1010 includes a combined blower system 1018 and mist system 1022 driven by a single motor 1200. More specifically, the single motor 1200 directly drives both the fan head 1078 and the air pump 1092. As such, operation of the blower system 1018 and mist system 1022 are linked such that both operate together allowing only for a "forced air mode" of operation. Furthermore, only a single mist switch 1204 is present which selectively provides electrical power to the single motor 1200 which, in turn, drives both systems 1018, 1022 together.

FIG. 5 illustrates another embodiment of the cold fogger 2010. The cold fogger 2010 is substantially similar to and operates in much the same manner as the cold fogger 10, described above. As such, only the differences between the two designs will be described herein. The cold fogger 2010 does not include a blower system. More specifically, the fogger 2010 only includes a single motor 2200 driving the air pump 2092 of the mist system 2022. Therefore, the fogger 2010 is only operable in the "ambient air mode" of operation (described above). Furthermore, the fogger 2010 only includes a single mist switch 2204 to drive the mist system 2022.

FIGS. **6*a* and 6*b* illustrate another embodiment of the cold fogger 3010. The cold fogger 3010 is substantially similar to and operates in much the same manner as the cold fogger 10, described above. As such, only the differences between the two designs will be described herein. The cold fogger 3010 includes a mist system 3022 with a tube 3096 having axially spaced compressed air inlets 3136*a*, 3136*b*, 3136*c*. Each inlet 3136*a*, 3136*b*, 3136*c* is positioned proximate the top of the reservoir volume 3104 and configured to be above the surface level of the fluid 3034 contained therein. As such, each compressed air inlet 3136*a*, 3136*b*, 3136*c* allows compressed air contained within the reservoir volume 3104 to flow into the channel 3124 and create a low pressure region 3140 therein via a venturi effect (Flow B' of FIGS. 6*a* and 6*b*). In the illustrated embodiment, each inlet 3136*a***,

3136b, 3136c is substantially circular in shape having a diameter of approximately 2 mm. However, in other embodiments, different sizes and shapes of inlets may be present.

Figure 6A:
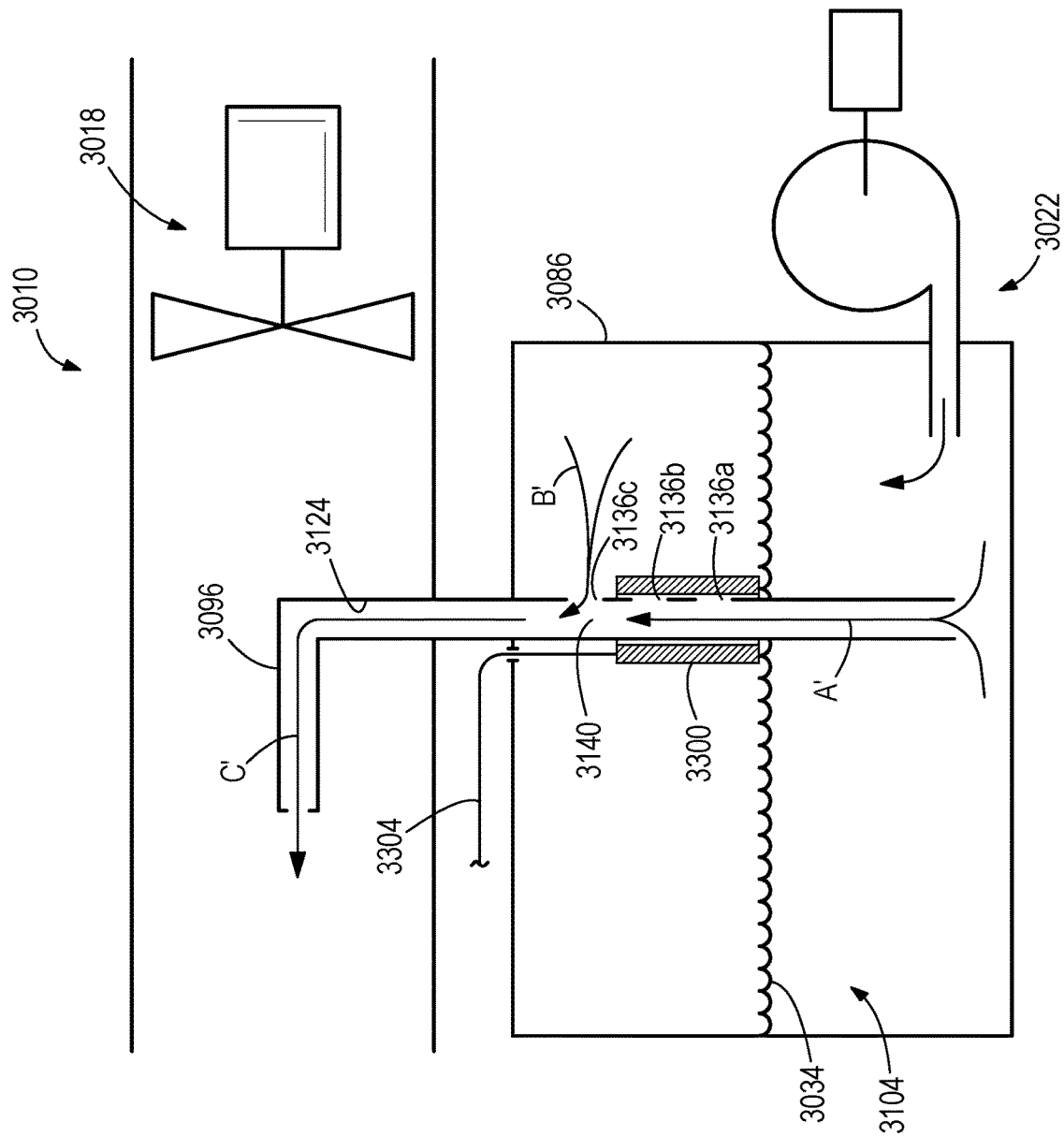
FIGS. 6*a* and 6*b* illustrate another embodiment of a cold fogger.
Figure 6B:
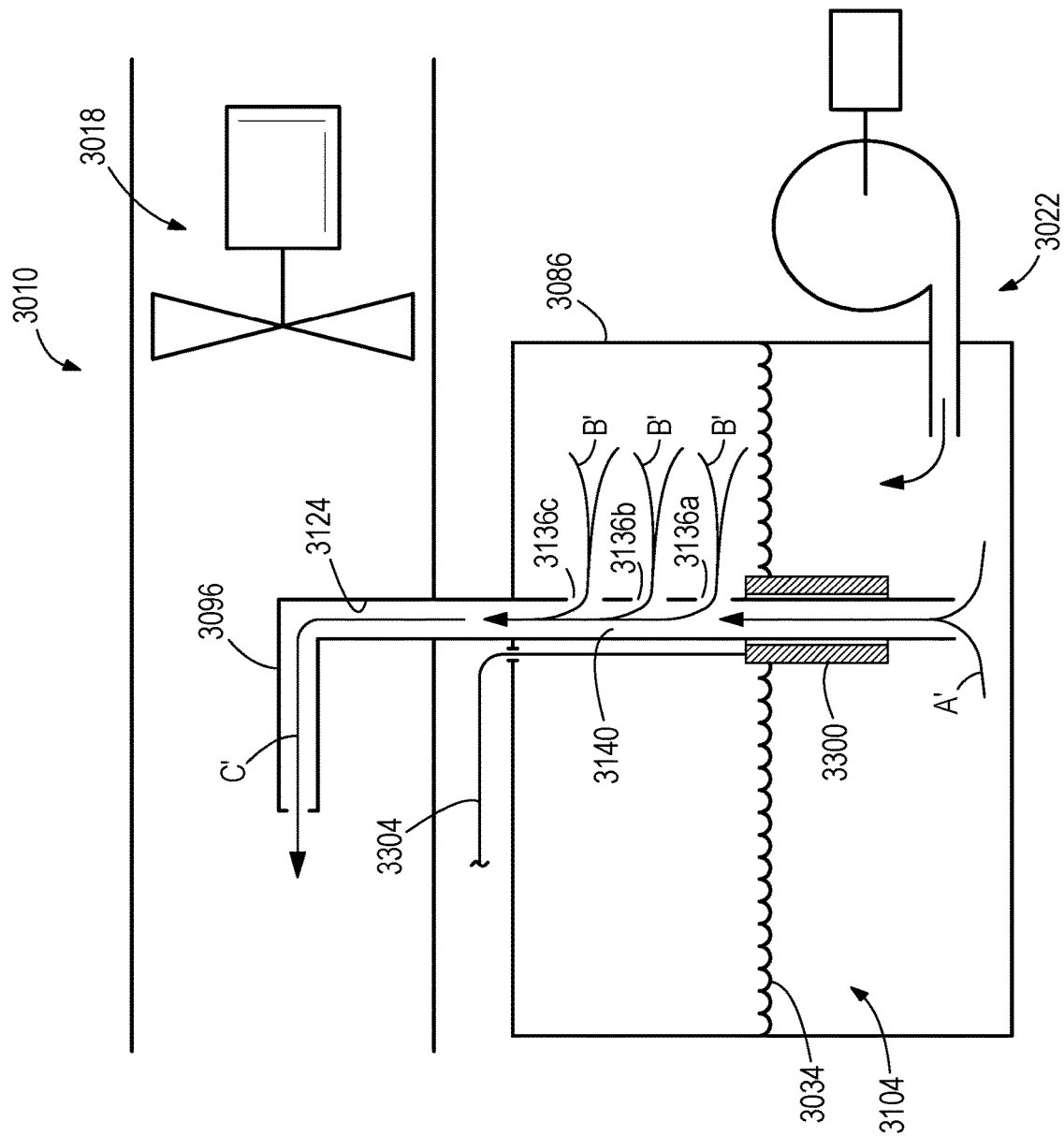

The cold fogger 3010 also includes a sleeve 3300 at least partially encompassing the tube 96 and axially slidable along the length thereof to selectively restrict access to one or more of the compressed air inlets 3136a, 3136b, 3136c. More specifically, the sleeve 3300 is axially movable with respect to the tube 3096 between a first position, where the sleeve 3300 does not restrict access to any of the compressed air inlet 3136a, 3136b, 3136c (FIG. 6b); a second position, where the sleeve 3300 restricts access to the first compressed air inlet 3136a (not shown); and a third position, where the sleeve 3300 restricts access to the first and second compressed air inlets 3136a, 3136b (FIG. 6a). The sleeve 3300 also includes a cable 3304 coupled thereto to allow the user to move the sleeve 3300 between the first, second, and third positions while maintaining the air-tight integrity of the reservoir volume 3104. In other embodiments, other forms of sleeve actuation may be used.

During use, movement of the sleeve between the first, second, and third positions allows the user to vary the volume of compressed air entering the channel 3124 of the tube 3096. Such changes allow the user to compensate for changes in viscosity of the fluid 3034 contained within the reservoir volume 3104 and maintain a substantially constant fluid to air ratio in the resulting fog. For example, if a chemical having a relatively low viscosity is used, the user may bias the sleeve 3300 so that fewer inlets 3136 are restricted (FIG. 6b) allowing for more air to flow into the channel 3124. In contrast, if a chemical with a relatively high viscosity is used, the user may bias the sleeve 3300 so that more inlets 3136 are restricted allowing less air to flow into the channel 3124.

Figure 7:
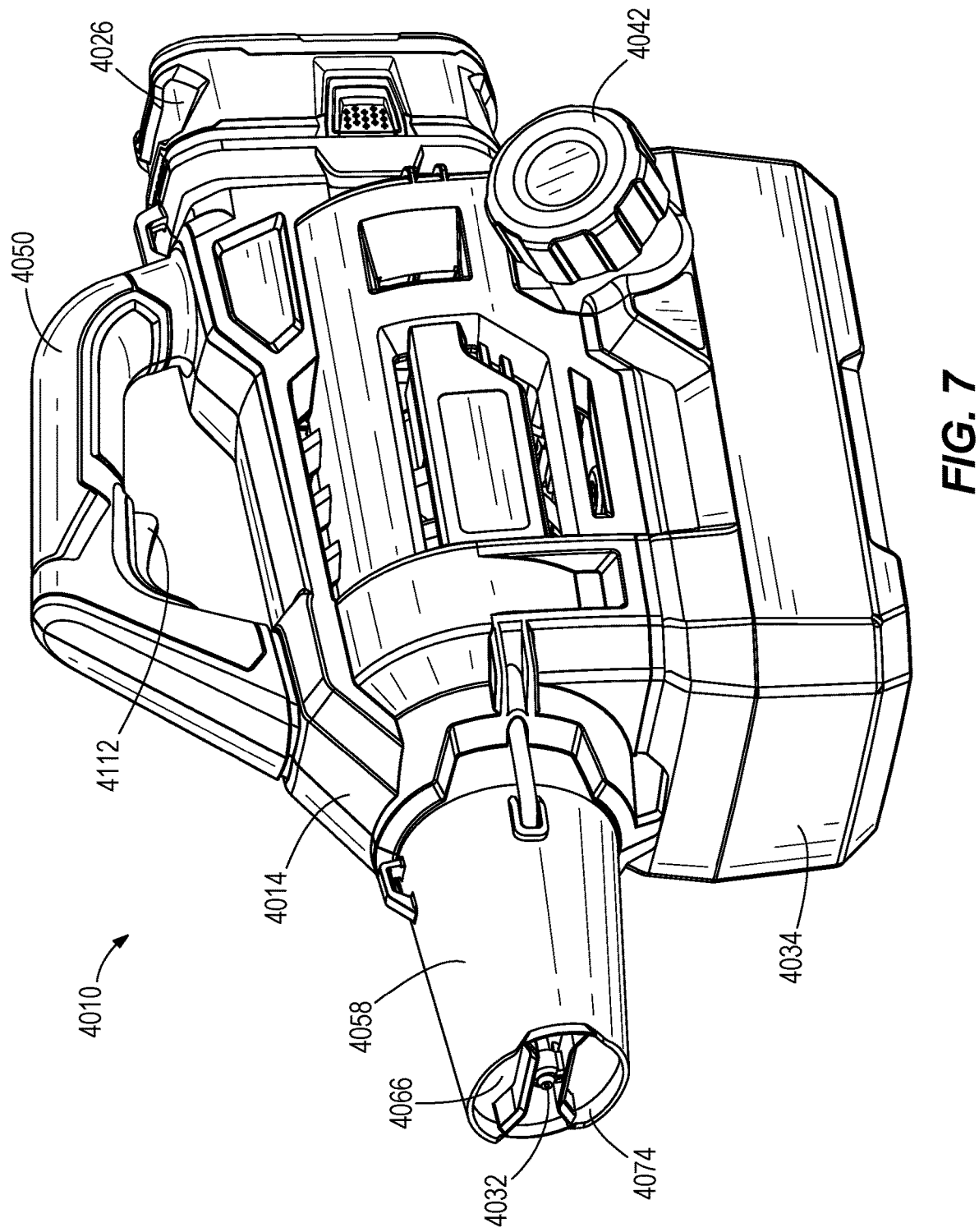
FIG. 7 is a perspective view of a cold fogger according to another embodiment of the invention.
Figure 8:
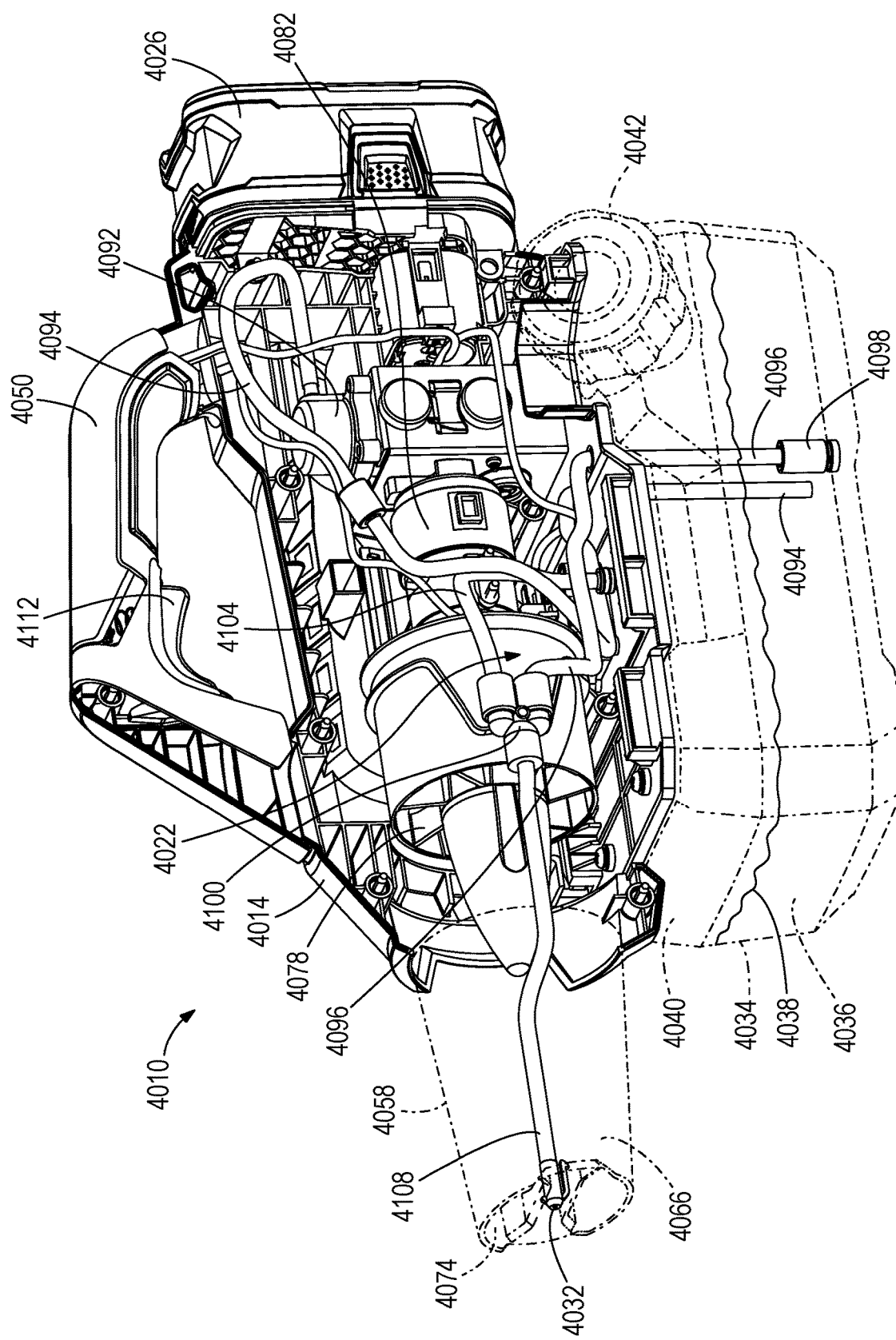
FIG. 8 is a perspective view of the cold fogger of FIG. 7, with a blower tube and a reservoir shown in phantom lines.

FIGS. 7 and 8 illustrate another embodiment of a cold fogger 4010 according to one embodiment of the invention. The fogger 4010 includes a housing 4014, a mist system 4022, a fan 4078, a motor 4082 to drive the mist system 4022 and the fan 4078, and a battery pack 4026 to provide energy to the motor 4082. The mist system 4022 is configured to produce a cloud of fog, vapor, spray or mist of a preselected fluid 4036. The fan 4078, in turn, is configured to propel the mist toward a target area via an exhaust outlet 4074. Although the illustrated fogger 4010 is electrically powered by the battery pack 4026 (e.g., DC power), in alternative embodiments, the fogger 4010 may be AC powered (e.g., plugged into a standard home electrical socket), gas-powered (e.g., by one or more internal combustion engines), and the like. The housing 4014 includes one or more handle portions 4050 that the user may grasp during use to manipulate the orientation and position of the fogger 4010.

The fogger 4010 also includes a fluid reservoir 4034 to hold the volume of preselected fluid 4036 defining a fluid line 4038 above which exists a volume of air 4040. The fluid reservoir 4034 is coupled to the housing 4014, but fluidly sealed off from the housing 4014. The reservoir 4034 includes a selectively removable cap 4042 to allow the user to pour the desired fluid into the reservoir 4034 and subsequently seal the reservoir 4034.

The housing 4014 also includes a blower tube 4058 at least partially supported by the housing 4014. The tube 4058 defines a passageway 4066 therethrough. The exhaust outlet 4074 is at the end of the blower tube 4058 providing an exit through which the mist may be discharged during operation. In the illustrated embodiment, the blower tube 4058 is substantially frusto-conical in shape reducing in diameter as it extends outwardly from the housing 4014 to accelerate the flow of mist through the exhaust outlet 4074. The fan 4078 is positioned within the passageway 4066 of the blower tube 4058.

As shown in FIG. 8, the mist system 4022 of the cold fogger 4010 includes an air pump 4092 in the housing 4014, an air tube 4094 fluidly coupling the air pump 4092 to the volume of fluid 4036 within the reservoir 4034, and a fluid tube 4096 having a first end 4098 in the volume of fluid 4036 within the reservoir 4034 and extending to an atomizing valve 4100 within the housing 4014. The air pump 4092 is driven by the motor 4082 and in the illustrated embodiment, the air pump 4092 is a reciprocating piston pump. The mist system 4022 also includes an air escape line 4104 fluidly coupling the volume of air 4040 within the reservoir 4034 to the atomizing valve 4100. A dispensing line 4108 extends from the atomizing valve 4100 and into the passageway 4066 of the tube 4058, where it terminates at an outlet 4032. The speed at which the motor 4082 operates dictates the rate at which air is pumped into the reservoir volume 4034 and, as a corollary, the resulting air pressure therein. As such, the air pressure within the reservoir 4034 can be varied by changing the operating speed of the motor 4082. More specifically, operating the motor 4082 at a first speed conveys a first flow rate of compressed air into the reservoir 4034, while operating the motor 4082 at a second speed, less than the first speed, conveys a second flow rate of compressed air into the reservoir 4034 less than the first flow rate.

During operation, an operator depresses a trigger 4112 on the handle 4050 to activate the motor 4082. Thus, the motor 4082 begins rotating the fan 4078 and begins driving the air pump 4092, which causes compressed air to flow through the air tube 4094 from the air pump 4092 and into the volume of fluid 4036 in the reservoir 4034. As the air in the volume of air 4040 above the fluid line 4038 becomes pressurized, the air moves through the air escape line 4104 towards the atomizing valve 4100 and through the dispensing line 4108, which is at lower pressure than the reservoir 4034. The atomizing valve 4100 includes a venturi structure, such that the air moves through the atomizing valve 4100 at high velocity, resulting in a reduction in pressure that causes the fluid in the volume of fluid 1036 to be drawn up through the first end 4098 of the fluid tube 4096 and to the atomizing valve 4100. As the fluid meets the high velocity air stream in the atomizing valve, the fluid is atomized, forming an atomized fluid flow that travels through the dispensing line 4108 and is dispensed from outlet 4032. In some embodiments, outlet 4032 can be configured to further atomize the fluid exiting the dispensing line 4104. The air flow generated by the fan 4078 expels the atomized fluid or mist through the exhaust outlet 4074. Once the operator has finished the misting operation, the operator releases the trigger 4108, causing both the fan 4078 and the air pump 92 to cease operation. Once the pump 92 is turned off, the air pressure within the reservoir 4034 returns to equilibrium.

Various features of the invention are set forth in the following claims.

What is claimed is:

1. A fogger comprising:
a blower tube having a passageway;
a fan configured to rotate to generate an airflow through the passageway;
a reservoir configured to hold a volume of fluid and a volume of air;
an air pump in fluid communication with the fluid in the reservoir;

a motor configured to drive the fan and the air pump;

an atomizing valve;

a dispensing line fluidly coupling the atomizing valve to the passageway;
a liquid tube fluidly coupling the fluid in the reservoir to the atomizing valve; and
an air escape line fluidly coupling the air in the reservoir to the atomizing valve,
wherein in response to the air pump providing a stream of compressed air to the reservoir, air moves through the air escape line from the reservoir to the atomizing valve, such that fluid is drawn through the liquid tube and into the atomizing valve to be atomized
wherein the air escape line further includes a first inlet, a second inlet, and a third inlet for allowing air into the air escape line, and
further comprising a sleeve movable along the air escape line between a first position, in which the sleeve does not restrict access to any of the first inlet, the second inlet, or the third inlet, a second position, in which the sleeve restricts access to the first inlet, such that the second inlet and the third inlet are in fluid communication with the air, and a third position, in which the sleeve restricts access to the first inlet and the second inlet, such that the third inlet is in fluid communication with the air and the first inlet and the second inlet are not in fluid communication with the air.

2. The fogger of claim 1, wherein the reservoir includes a selectively removable cap.

3. The fogger of claim 1, wherein the air pump is a reciprocating piston pump.

4. The fogger of claim 1, further comprising a battery to power the motor.

5. The fogger of claim 1, further comprising an outlet on the dispensing line, the outlet configured to further atomize the fluid moving out of the dispensing line.

6. A fogger comprising:
a blower system including a fan and a blower tube having a passageway, the fan configured to rotate to generate an airflow through the passageway;
a mist system including
a reservoir configured to hold a fluid,
an air pump in fluid communication with the reservoir, and
a tube in fluid communication with and extending between both the reservoir and the passageway; and
a motor configured to drive rotation of the fan and configured to drive a pump unit of the air pump,
wherein the reservoir is further configured to hold a volume of air above the fluid, and wherein the tube includes a first end in the fluid in the reservoir, a second end in the passageway, and a first inlet arranged in the reservoir in between the first end and the second end, the first inlet in communication with the volume of air, and wherein in response to the air pump delivering a stream of compressed air to the fluid, the air in the reservoir is configured to move into the first inlet and toward the second end of the tube,
wherein the tube includes a second inlet arranged in the reservoir in between the first end and the second end, the second inlet in communication with the volume of air, and wherein in response to the air pump delivering the stream of compressed air to the fluid, the air in the reservoir is configured to move into the second inlet and toward the second end of the tube,
wherein the tube includes a third inlet arranged in the reservoir in between the first end and the second end, the third inlet in communication with the volume of air, and wherein in response to the air pump delivering the stream of compressed air to the fluid, the air in the reservoir is configured to move into the third inlet and toward the second end of the tube, and
further comprising a sleeve moveable along the tube within the reservoir between a first position, in which the sleeve does not restrict access to any of the first, second and third inlets, such that the first, second and third inlets are in fluid communication with the air in the reservoir, a second position, in which the sleeve restricts access to the first inlet, such that the second and third inlets are in fluid communication with the air in the reservoir and the first inlet is not in fluid communication with the air in the reservoir, and a third position, in which the sleeve restricts access to the first and second inlets such that the third inlet is in fluid communication with the air in the reservoir and the first and second inlets are not in fluid communication with the air in the reservoir.

7. The fogger of claim 6, further comprising a battery to power the motor.

8. The fogger of claim 6, further comprising a valve in fluid communication with the tube and in between a first end of the tube in the reservoir and a second end of the tube in the passageway, the valve configured to selectively restrict a fluid flow between the first and second ends.

* * * * *